United States Patent [19]

Lochow et al.

[11] Patent Number: 4,664,780
[45] Date of Patent: May 12, 1987

[54] HYDROCARBON CRACKING WITH YTTRIUM EXCHANGED ZEOLITE Y CATALYST

[75] Inventors: Charles F. Lochow, Russell; Daniel B. Kovacs, Ashland, both of Ky.

[73] Assignee: Ashland Oil, Inc., Ashland, Ky.

[21] Appl. No.: 794,350

[22] Filed: Nov. 1, 1985

[51] Int. Cl.⁴ .................... C10G 11/05; B01J 29/08
[52] U.S. Cl. ................................ 208/120; 502/65; 502/79
[58] Field of Search ............... 208/120; 502/65, 79

[56] References Cited

U.S. PATENT DOCUMENTS

| | | | |
|---|---|---|---|
| 3,210,267 | 10/1965 | Plank et al. | 208/120 |
| 4,164,465 | 8/1979 | Gladrow | 208/120 |
| 4,259,212 | 3/1981 | Gladrow et al. | 502/65 |
| 4,429,053 | 1/1984 | Ward | 502/65 |
| 4,437,978 | 3/1984 | Chester et al. | 208/120 |
| 4,492,626 | 1/1985 | Kukes | 208/251 H |
| 4,542,116 | 9/1985 | Bertolacini et al. | 502/65 |

Primary Examiner—Olik Chaudhuri
Attorney, Agent, or Firm—Richard C. Willson, Jr.; C. William Crady

[57] ABSTRACT

A hydrocarbon cracking catalyst comprises rare earth exchanged "Y" zeolite which has been further ion exchanged to enhance the yttrium content. The catalyst is employed in a fluid catalytic cracking process to maximize gasoline.

3 Claims, 1 Drawing Figure

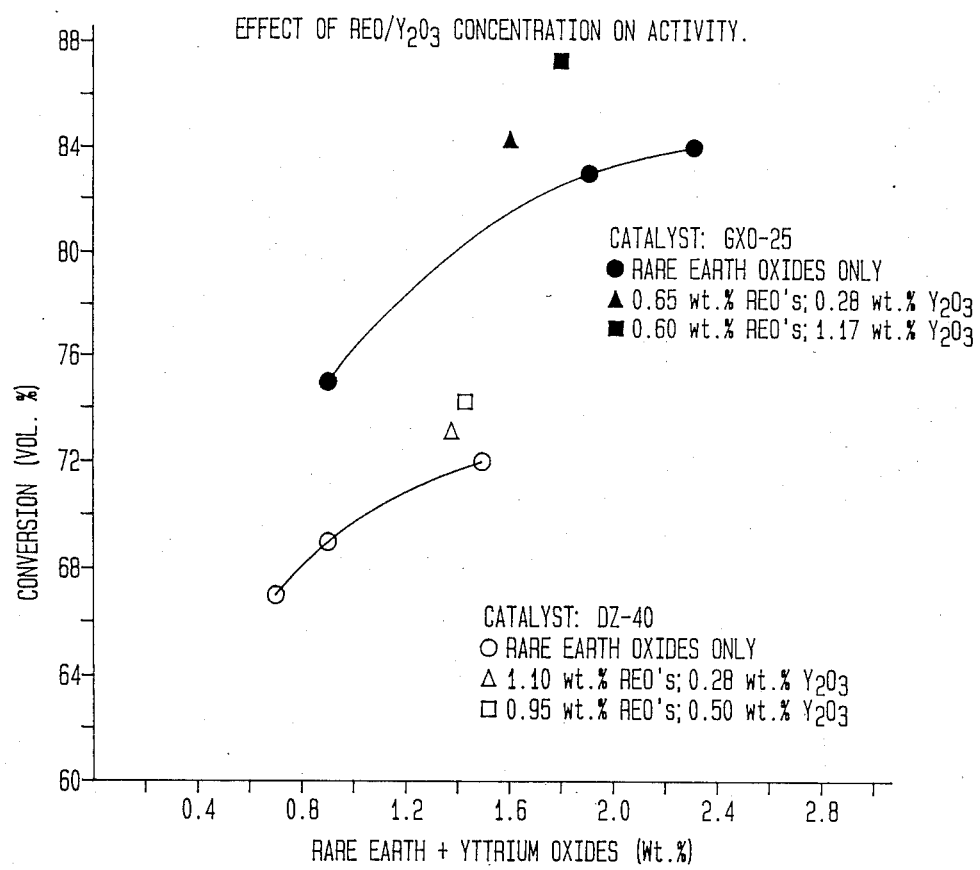

HYDROCARBON CRACKING WITH YTTRIUM EXCHANGED ZEOLITE Y CATALYST

BACKGROUND OF THE INVENTION

The present invention relates to hydrocarbon cracking catalysts containing yttrium and to the use of such catalysts in the cracking of hydrocarbon feedstock to maximize gasoline production.

Hydrocarbon cracking catalysts containing rare earth exchanged zeolites are in wide commercial use and their general technical properties have been reviewed in the literature, e.g. Fluid Catalytic Cracking with Zeolite Catalysts, Venuto and Habib, 1979 Marcel Dekker, Inc., pp. 30–49 and Chemistry of Catalytic Processes, Gates et al, 1979, McGraw Hill, pp. 49–57 and pp. 78–85. The commercial rare earth mixtures used for ion exchange with zeolites comprise cerium, lanthanum, prasodymium, neodymium and other rare earths including trace amounts of yttrium.

Hydrocarbon cracking catalysts comprising Y-type zeolites exchanged with rare earths have been disclosed in numerous patents including, for example, U.S. Pat. No. 3,436,357, Y zeolite exchanged with rare earth; U.S. Pat. No. 3,930,987, rare earth exchange including yttrium inter-alia.

U.S. Pat. No. 4,405,443, discloses that zeolite exchanged with rare earth, the mixed with yttrium and an inorganic oxide provides an absorbent for sulfur oxides.

SUMMARY OF THE INVENTION

In accordance with the invention there is provided a hydrocarbon cracking catalyst comprising a rare earth exchanged Y-type zeolite, disposed in a matrix, which has been ion exchanged with yttrium. The invention also provides a fluid catalytic cracking process using the catalyst in which maximum gasoline is produced.

BRIEF DESCRIPTION OF THE FIGURE

The FIGURE is a graphical representation of the effect of rare earth concentration and yttrium concentration on catalyst activity and conversion.

DETAILED DESCRIPTION OF THE INVENTION

The catalyst of the present invention is made by ion exchanging yttrium into a commercially available rare earth exchanged Y-type zeolite such as DZ-40 available from Davison Chemical Co. and GXO-25 available from Davison Chemical Company, Baltimore, Md. Catalysts comprising Y-type zeolites dispersed in a matrix comprising clay with or without acid modifiers dispersed in a silica or silica alumina of gelaceous or colloidal type are suitable.

Only trace amounts of yttrium are detectable in these commercial cracking catalysts.

DZ-40 comprises about 15 wt% REUSY (rare earth ultrastable zeolite Y) composited with a matrix comprising about 50 wt.% silica alumina and about 35 wt.% clay.

GXO-25 comprises about 15 wt.% REUSY composited with silica alumina and clay.

The REY zeolite catalyst starting material may contain from 0.2 to 3.0 wt.% rare earths and the catalyst will have a pore volume of 0.2 cc/gm to 0.6 cc/gm.

Yttrium may be incorporated into the catalyst by ion exchange with solutions of the chloride, bromide, iodide thereof or with nitrates and sulfates of yttrium.

A yttrium exchanged catalyst was prepared in the following manner.

The as received catalyst (DZ-40) was ion-exchanged, for two hours at approximately 90° C. with constant stirring, using a 0.10 molar YCl3 solution (10 g catalyst on dry basis/100 ml solution, final solution pH was 3.70).

This slurry was then filtered and the catalyst washed three times with hot (90° C.) deionzed water (100 ml water/10 g catalyst). The catalyst was then dried overnight in a drying oven at 75° C. The catalyst sample was then split in half. One half was calcined at 1000° F. for 3 hours.

The second half of the catalyst sample was further yttrium exchanged as described above except that a 0.30M YCl3 solution was used (final solution pH was 3.80). This sample was washed, dried, and calcined as described above.

Samples were hydrothermally deactivated at 1450° F. for 5 hours (100% steam). Microactivity testing was done on the hydrothermally deactivated samples.

Catalysts according to the invention will contain 0.2 to 3.0, preferably 0.3 to 1.2 wt.% yttrium.

For purposes of comparison, DZ-40 and GXO-25 catalysts were ion exchanged with additional rare earth solution in the following manner.

The catalyst (15 g catalyst on dry basis/100 ml solution; final solution pH was 3.80) was ion exchanged for two hours at approximately 90° C. with constant stirring using a rare earth chloride solution prepared by diluting into 1 liter of deionized water, four ml of a Molycorp Inc. rare earth concentrate solution (the Molycorp RE chloride concentrate solution contained approximately-60 wt.% $La_2O_3$, 10 wt.% $CeO_2$, 21.5 wt.% $Nd_2O_3$ 7.5 wt.% $Pr_6O_{11}$ and 1.0 wt% other REO's).

This slurry was then filtered and the catalyst washed three times with hot (90° C.) deionized water (100 ml water/10 g catalyst). The catalyst was then dried overnight in a drying oven at 75° C. and then calcined at 1000° F. for 3 hours.

An additional sample of as received catalyst was rare earth exchanged as described above except that the rare earth solution was prepared by diluting 15 ml of the RE concentrate into 1 liter of deionized water (final solution pH was 3.95). This sample was washed, dried, and calcined as described above.

Samples were hydrothermally deactivated at 1450° F. for 5 hours (100% steam). Microactivity testing was done on the hydrothermally deactivated samples.

Comparative cracking experiments were made utilizing catalysts augmented with additional REO's and with yttrium. The properties of the gas oil cracking feed are shown below in Table 1.

TABLE 1

Feed: West Texas Intermediate Blend
(50 vol % Light VGO >630° F. and 50
vol % Bulk Distillate (55% overhead Fraction))

| Analysis | |
|---|---|
| API Gravity | 27.4 |
| Ramsbottom Carbon, wt % | 0.14 |
| Sulfur, wt % | 0.57 |
| Nitrogen, ppm | |
| Total | 994 |
| Basic | 262 |

TABLE 1-continued

Feed: West Texas Intermediate Blend
(50 vol % Light VGO >630° F. and 50
vol % Bulk Distillate (55% overhead Fraction))

Distillation (D2887-78):

| Wt % | Temp. °F. |
|---|---|
| 10 | 648 |
| 30 | 704 |
| 50 | 759 |
| 70 | 823 |
| 90 | 893 |
| 94-95% >630° F., 100% >430° F. | |

Metals, ppm

| | |
|---|---|
| Nickel (Ni) | <1 |
| Vanadium (V) | <1 |
| Iron (Fe) | 2 |
| Sodium (Na) | 6 |

Heavy Hydrocarbon (HPLC), wt %

| | |
|---|---|
| Saturates | 62.6 |
| Mono. Aromatics | 7.7 |
| Di Aromatics | 9.9 |
| >Di Aromatics | 17.6 |
| Polar Aromatics | 2.2 |
| Asphaltenes | 0.0 |

The West Texas hydrocarbon fraction was cracked in an MAT unit employing the test unit and procedure outlined in ASTM D3907-80.

TABLE 2

Rare Earth/Yttrium Oxide Exchanged Catalyst*

| Catalyst | BEQ's (Wt %) | $Y_2O_3$ (Wt %) | Conv. Vol % | Gasoline (Wt %) | LCO (Wt %) | SO (Wt %) | Coke (Wt %) | Wet Gas (Wt %) | LCO/SO |
|---|---|---|---|---|---|---|---|---|---|
| 1 DZ-40 | 0.71 | 0 | 67 | 45.5 | 18.5 | 18.9 | 2.1 | 15.1 | 1.0 |
| 2 DZ-40 | 0.99 | 0 | 69 | 46.8 | 18.8 | 18.0 | 2.2 | 14.2 | 1.0 |
| 3 DZ-40 | 1.54 | 0 | 72 | 49.0 | 18.0 | 14.8 | 2.4 | 15.8 | 1.2 |
| 4 DZ-40 | 1.10 | 0.28 | 73 | 49.4 | 14.5 | 14.6 | 2.5 | 15.0 | 1.3 |
| 5 DZ-40 | 0.95 | 0.50 | 74 | 50.3 | 18.8 | 12.3 | 2.1 | 16.5 | 1.5 |
| 1 GXO-25 | 0.86 | 0 | 75 | 51.2 | 17.1 | 11.3 | 2.8 | 17.7 | 1.5 |
| 2 GXO-25 | 1.87 | 0 | 83 | 55.3 | 15.2 | 7.8 | 3.3 | 18.5 | 1.9 |
| 3 GXO-25 | 2.28 | 0 | 84 | 55.5 | 14.8 | 6.9 | 3.7 | 19.1 | 2.1 |
| 4 GXO-25 | 0.65 | 0.94 | 84 | 54.5 | 14.4 | 7.8 | 3.7 | 19.7 | 1.8 |
| 5 GXO-25 | 0.60 | 1.17 | 87 | 54.7 | 13.6 | 6.6 | 4.3 | 20.9 | 2.1 |

*Steamed at 1450° F./5 Hours.

As can be seen from the data in Table 2, the addition of yttrium provides a greater increase in gasoline production than the addition of rare earth oxides.

Activity data presented in Table 2 and the FIGURE, show that yttrium increases the catalytic activity of the DZ-40 catalysts. The addition of 0.28 wt.% yttrium as the oxide to DZ-40 cataystcontaining 1.10 wt.% rare earth oxides increased conversion from 69 to 73 volume %. Adding an equal amount of rare earth to the same catalyst increases activity to 71 volume % conversion (from the FIGURE). The addition of 0.50 wt.% yttrium as the oxide to the DZ-40 catalyst with 0.95 wt.% rare earth oxides increases activity from 69 to 74 volume %. Adding an equal amount of rare earth oxides increases conversion to 72 volume % (from the FIGURE). A commercially significant benefit of 2 volume % conversion for yttrium over the typical rare earth mixture was observed in each case. Increased gasoline yields and light cycle oil to slurry oil ratios were associated with these higher conversion levels.

Activity data presented in Table 2 and the FIGURE also show yttrium increases the catalytic activity of the GXO-25 catalyst. The addition of 0.94 wt% yttrium as the oxide to a catalyst containing 0.65 wt% REO's increased conversion from 71 to 84 volume %. Addition of an equal amount of rare earth oxides to the same catalyst increased conversion to only 82 volume % (from the FIGURE). Exchanging 1.17 wt% yttrium as the oxide into GXO-25 catalyst with 0.60 wt% REO's increased conversion from 70 to 87 volume %. Adding an equal amount of rare earth oxides increased conversion to only 83 volume % (from the FIGURE). Benefits of 2 and 4 volume % conversion for yttrium over the typical rare earth oxide mixture was observed in the two cases, respectively. Increased gasoline yields and light cycle oil to slurry oil ratios were associated with these higher conversion levels.

The test results presented in Table 2 have been plotted on the FIGURE. Yttrium exchanged catalyst, designated by squares and triangles provide greater conversion than rare earth (REO) exchanged catalysts, designated by circles.

The data presented herein indicate that the addition of yttrium to Y-type zeolite hydrocarbon cracking catalysts provides an increase in conversion, an increase in gasoline production and in desired light cycle oil (LCO) compared to undesired slurry oil (SO).

The cracking process of the invention is applied to petroleum hydrocarbon feedstocks such as whole crude oil, reduced crude, decarbonized and demetallized crude oil and fraction thereof such as gas oils boiling in the range of 450°-1100° F. Preferred conditions include a temperature in the range of 900°-1000° F. and a pressure in the range of 12 to 20 psig. The invention is applicable to conventional gas oil fluid catalytic as well as reduced crude cracking as disclosed in U.S. Pat. Nos. 4,495,063; 4,434,044; and 4,419,223.

Specific compositions, methods, or embodiments discussed are intended to be only illustrative of the invention disclosed by this Specification. Variation on these compositions, methods, or embodiments, are readily apparent to a person of skill in the art based upon the teachings of this Specification and are therefore intended to be included as part of the inventions disclosed herein.

Reference to patents made in the Specification is intended to result in such patents being expressly incorporated herein by reference including any patents or other literature references cited within such patents.

What is claimed is:

1. A process for cracking a gas oil boiling range hydrocarbon feedstock comprising the step of contacting the feedstock in a catalytic cracking zone under catalytic cracking conditions to produce convulsion products comprising gasoline with a catalyst composition comprising:
   A. a Y crystalline aluminosilicate zeolite, having the structure of faujasite and having uniform pore diameters and a silica to alumina mole ratio of at least about 5;

B. an inorganic oxide matrix; and
C. said zeolite having been ion exchanged with a mixture of rare earths prior to compositing with said matrix; and
D. said zeolite having been subsequently further ion exchanged with yttrium following compositing with said matrix, whereby the catalyst composition contains 0.30 to 3.0 wt.% yttrium.

2. Process according to claim 1 wherein said catalytic cracking conditions include a temperature ranging from 900° to 1000° F. and a pressure ranging from 12 to 20 psig.

3. Process according to claim 1 in which said conversion products comprise liquids and gases and said gasoline produced comprises at least 50 wt.% of the liquid conversion products.

* * * * *